(12) United States Patent
Levine (10) Patent No.: US 10,945,389 B1
(45) Date of Patent: Mar. 16, 2021

(54) PASSIVE NUTRIENT DELIVERY SYSTEM

(71) Applicant: United States of America as Represented by the Administrator of NASA, Washington, DC (US)

(72) Inventor: Howard G. Levine, Orlando, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 612 days.

(21) Appl. No.: 15/896,820

(22) Filed: Feb. 14, 2018

Related U.S. Application Data (60) Provisional application No. 62/458,607, filed on Feb. 14, 2017.

(51) Int. Cl.
*A01G 27/06* (2006.01)
*B64G 1/66* (2006.01)

(52) U.S. Cl.
CPC .............. *A01G 27/06* (2013.01); *B64G 1/66* (2013.01)

(58) Field of Classification Search
CPC ................................. A01G 27/04; A01G 27/06
See application file for complete search history.

(56) References Cited

U.S. PATENT DOCUMENTS

| | | | | |
|---|---|---|---|---|
| 1,264,096 | A | * | 4/1918 | Lelievre ................. A01G 27/04 47/81 |
| 2,344,202 | A | * | 3/1944 | Carlson ................. A01G 27/04 47/80 |
| 4,117,632 | A | * | 10/1978 | Pearce ................... A01G 27/04 47/81 |

(Continued)

FOREIGN PATENT DOCUMENTS

| | | | |
|---|---|---|---|
| AT | 291660 B | * 7/1971 | ............. A01G 27/06 |
| EP | 2982239 A1 | 10/2016 | |

(Continued)

OTHER PUBLICATIONS

"CapMat II Capillary Matting," Phytotronics, Inc., Earth City, MO, 1998, pp. 2.
"Dupont Tyvek Commercial Wrap, a Durable, High Performance Weather Barrier Engineered Specifically for Commercial Construction," Technical Data Sheet, Apr. 2015, pp. 2.

(Continued)

*Primary Examiner* — Magdalena Topolski
(74) *Attorney, Agent, or Firm* — Jonathan J. Leahy; Mark Homer (57) ABSTRACT

A passive nutrient delivery system for plant growth includes a rooting module having a body portion having a top, a bottom, and a sidewall extending between the top and the bottom. The rooting module further includes a hydrophilic plug, having an opening, in a first portion of the interior of the body portion adjacent the top of the body portion, and a substrate in a second portion of the interior of the body portion between the bottom and the plug. The rooting module further includes an oxygen permeable area in the sidewall of the body portion, a first wicking material extending through the sidewall of the body portion into the interior of the body portion, and a second wicking material extending through the body of the body portion into the interior of the body portion, through the interior of the body portion, and through the opening of the plug. The passive nutrient delivery system also comprises a reservoir wherein a port can receive the removable rooting module.

16 Claims, 6 Drawing Sheets

(56) References Cited

U.S. PATENT DOCUMENTS

| | | | |
|---|---|---|---|
| 4,339,891 A * | 7/1982 | Bassett | A01G 27/04 47/71 |
| 4,407,092 A * | 10/1983 | Ware | A01G 31/02 47/64 |
| 4,926,585 A | 5/1990 | Dreschel | |
| 6,032,413 A | 3/2000 | De Groot et al. | |
| 6,789,691 B2 | 9/2004 | Martin et al. | |
| 7,658,034 B1 * | 2/2010 | Dickson | A01G 9/02 47/66.1 |
| 7,712,253 B2 | 5/2010 | Gesser et al. | |
| 10,362,736 B2 * | 7/2019 | Visser | A01G 27/008 |
| 2004/0148856 A1 * | 8/2004 | Sawyer | A01G 27/005 47/81 |
| 2004/0200142 A1 * | 10/2004 | Ito | A01G 27/04 47/41.14 |
| 2009/0223124 A1 * | 9/2009 | Pasquariello | A01G 27/04 47/66.1 |
| 2017/0359977 A1 * | 12/2017 | Contillo | A01G 27/06 |
| 2019/0045730 A1 * | 2/2019 | Littlewood | A01G 24/00 |

FOREIGN PATENT DOCUMENTS

| | | | | |
|---|---|---|---|---|
| GB | 2107962 A * | 5/1983 | | A01G 27/04 |
| WO | WO-0183690 A2 * | 11/2001 | | A01G 31/02 |

OTHER PUBLICATIONS

"Lubricent UV, UV Curable Hydrophilic Coating for Medical Devices," Harland Medical Systems, Eden Prairie, MN, Jul. 12, 2016, pp. 4.

G. D. Massa, et al., "Plant Pillow Preparation for the Veggie Plant Growth System on the International Space Station," Research Article, Gravitational and Space Research, vol. 5(1), NASA Kennedy Space Center, FL, Jul. 2017, pp. 11.

"Hydrobead," Material Safety Data Sheet (MSDS), Hydrobead, La Jolla, CA, Apr. 27, 2011, pp. 4.

"Aculon Multi-Surface Hydrophobic Treatment," Product Information Sheet, Aculon, San Diego, CA, pp. 3.

"Nanomyte SuperCN," Technical Data Sheet, NEI Corporation, Somerset, NJ, Feb. 22, 2017, pp. 2.

"NanoSlic NS 110 Coating," Product Information Sheet, Florida CirTech, Greeley, CO, pp. 1.

"Rootcubes, Oasis Grower Solutions Foam Medium," Product Information Sheet, Oasis Grower Solutions, Kent, OH, Mar. 8, 2016, pp. 2.

"Horticubes, Oasis Grower Solutions Foam Medium," Product Informaiton Sheet, Oasis Grower Solutions, Kent, OH, Mar. 7, 2016, pp. 2.

R. Morrow, "Orbitec Verification Analysis Result," Orbital Technologies Corporation, Jun. 23, 2016, pp. 6.

W. Zhou, "Adcvances in Space-Based Plant Research Technologies," Wisconsin Center for Space Automation and Robotics, College of Engineering, University of Wisconsin-Madison, Sep. 2011, pp. 16.

"SCS Medical Coatings," Product Information Sheet, Specialty Coating Systems, Indianapolis, IN, 2016, pp. 6.

G. D. Massa, et al., "Veg-01: Veggie Hardward Validation Testing on the International Space Station," De Gruyter Open, Jan. 15, 2017, pp. 9.

H. G. Levine, "A Space Flight Cultivation Protocol for *Arabidopsis*" Proc. of the Symp. "Life in Space for Life on Earth." European Space Agency ISBN 978-92-9221-227-8 ISSN 1609-042X, 2008.

* cited by examiner

PASSIVE NUTRIENT DELIVERY SYSTEM

CROSS-REFERENCE TO RELATED APPLICATIONS

This application claims the benefit of priority under 35 U.S.C. § 119(e) to U.S. Provisional Application Ser. No. 62/458,607 filed Feb. 14, 2017, the contents of which are incorporated herein by reference in their entirety.

ORIGIN OF THE INVENTION

The invention described herein was made by an employee of the United States Government, and may be manufactured and used by or for the Government for Government purposes without the payment of any royalties thereon or therefore.

BACKGROUND OF THE INVENTION

1. Technical Field

The present disclosure relates generally to systems for zeoponics agriculture, and more specifically to passive nutrient delivery systems for zeoponics agriculture in microgravity environments.

2. Description of the Related Art

Long-duration missions into the solar system will generally require a fresh food supply to supplement crew diets, which means growing crops in space. One existing system for crop growth consists of enclosing a substrate, supplemented with slow release fertilizer pellets, into a sealed pillow that is wetted on orbit by astronauts actively pumping water from a storage bag through quick disconnect fittings into a root mat reservoir situated below the pillows, and into the plant pillows themselves at experiment initiation. The pillow and root mat reservoir each contain a membrane that when mated together on-orbit are intended to passively supply water through capillary action from the reservoir to the substrate within the pillow.

Reliable seed germination generally requires an environment that is neither too dry nor too wet. However, water passage in such pillow/mat systems may be inconsistent for a number of reasons, such as lack of good contact, clogging of the membranes with precipitates, etc. Another potential deficiency of such designs may be a lack of indication of water content within the pillows. This may result in a need to create a watering schedule based upon the use of ground based empirically-derived data, visual cues from on-orbit pictures, or emergency crew actions upon detection of underperforming (or wilting) plants.

DETAILED DESCRIPTION OF THE INVENTION

In the following detailed description, reference is made to the accompanying drawings that form a part hereof, and in which is shown, by way of illustration, specific embodiments. In the drawings, like reference numerals describe substantially similar components throughout the several views. Other embodiments may be utilized and structural, logical, and electrical changes may be made without departing from the scope of the present invention. The following detailed description is, therefore, not to be taken in a limiting sense.

The Passive Orbital Nutrient Delivery System (PONDS) of various embodiments is a plant growth approach that contains both an area for a contained plant growth substrate and a reservoir for water and/or plant nutrient solutions. The system facilitates more reliable water delivery to seeds for germination (e.g., while avoiding overwatering), and further facilitates transport of water from the reservoir for improved plant growth while providing adequate nutrients and aeration to the root zone under both 1 g and microgravity conditions.

For various embodiments, wicking material, e.g., a capillary matting, may passively link a water/nutrient solution reservoir to a removable rooting module containing a substrate adapted to support plant growth. To enhance aeration to the root zone, oxygen permeable windows may be incorporated into both the reservoir walls and the rooting modules, bringing in oxygen from outside of the system into the reservoir and then into the rooting modules where the plant's roots may be growing. Water may be delivered from the reservoir to the substrate contained within the rooting module through the use of wicking material inserted into the plant growing substrate both from the bottom and from the sides of the rooting module. The wicking material must be intrinsically hydrophilic, thus facilitating wicking of water to the substrate throughout plant growth. The system may therefore be self-watering and continuously supply water to the root zone encompassed within the rooting module on demand. A foam plug may surround wicking material in a seed insertion zone, to both contain the substrate within the rooting module, which can be important for microgravity operation, and to facilitate removal of excess moisture from the wicking material before it can encompass and drown the seeds prior to germination.

Figures 1A, 1C:
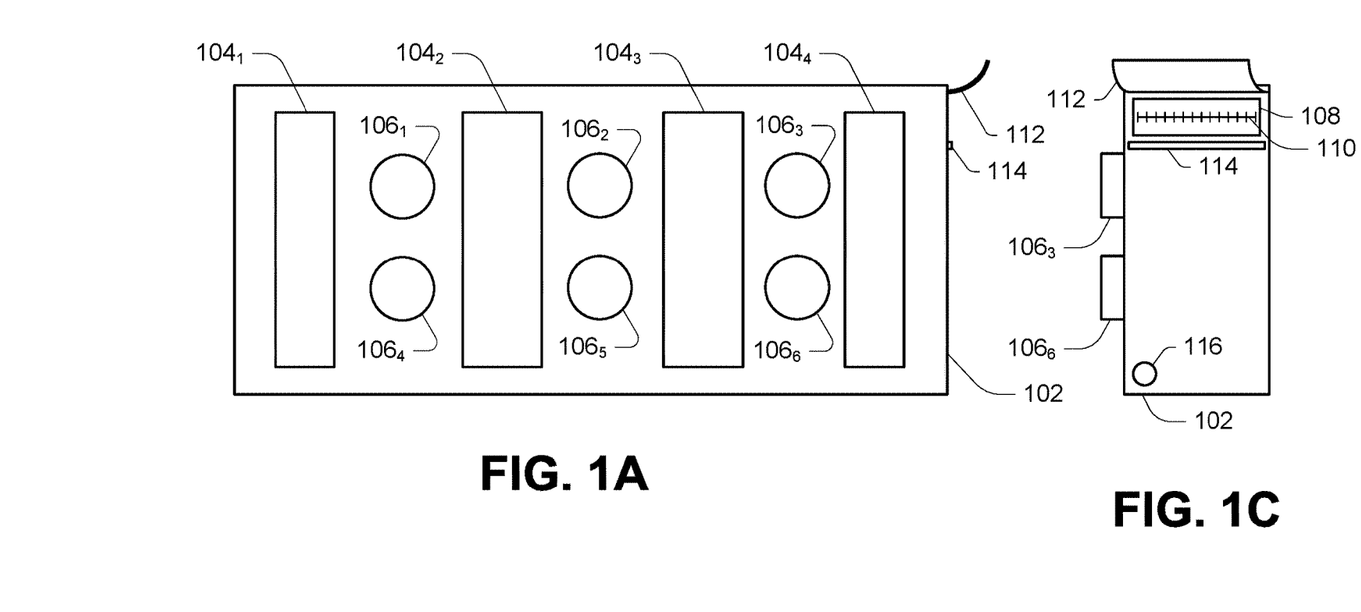
FIGS. 1A-1C depict a top view and two side views of a passive nutrient delivery system according to an embodiment.
Figure 1B:
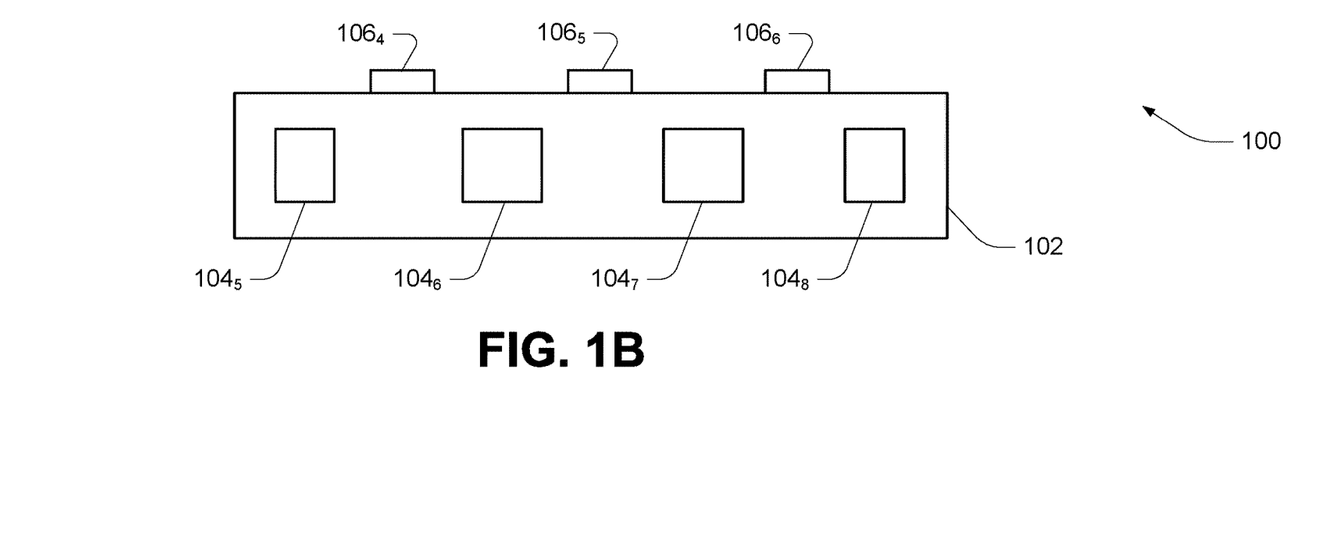

FIG. 1A depicts a top view, and FIGS. 1B-1C depict two side views, of a passive nutrient delivery system 100 according to an embodiment. The system 100 includes a reservoir 102. The reservoir 102 may be formed of a watertight material (e.g., a plastic, such as polycarbonate). The reservoir 102 may further be opaque (e.g., black), to limit light penetration into the interior of the reservoir 102, and thus limit microbial growth.

The reservoir 102 may include one or more oxygen permeable areas 104 (e.g., oxygen permeable areas 1041-1048) to facilitate intake of oxygen into the interior of the reservoir 102. The oxygen permeable areas 104 may be on the top of the reservoir 102 (e.g., oxygen permeable areas 1041-1044) and on one or more of the sides of the reservoir 102 (e.g., oxygen permeable areas 1045-1048). The oxygen permeable areas 104 may be formed of an opening in the reservoir 102 covered with an oxygen permeable membrane (e.g., TYVEK COMMERCIALWRAP available from E. I. du Pont de Nemours and Company, Wilmington, Del., USA). The collective area of the oxygen permeable areas 104 may be determined, for example, from an expected oxygen need relative to an ability of the oxygen permeable membrane to pass oxygen in the installed ambient conditions. The collective area of the oxygen permeable areas 104 may alternatively be determined to maintain water contained in the reservoir 102 at an oxygen equilibrium with the atmosphere surrounding the reservoir 102, regardless of plant intake. For one embodiment, the collective area of the oxygen permeable areas 104 is approximately 0.2 $cm^2$ for every 1 $cm^3$ of reservoir volume.

One or more rooting modules 106 may be inserted into the reservoir 102 (e.g., rooting modules 1061-1066) that will be described in more detail in additional figures. The rooting modules 106 are configured to contain a substrate for root growth of plants to be grown in the rooting modules 106, and to provide for water and oxygen intake from within the reservoir 102.

The reservoir 102 may further include a viewing port 108 to permit inspection of a water level within the reservoir 102 and/or to view portions of the rooting modules 106 inside the reservoir 102. The viewing port 108 may include gradations 110 to facilitate more accurate assessments of the water level. A cover 112 may be included to cover the viewing port 108 when not in use. Like the reservoir 102, the cover 112 may be opaque. For one embodiment, the cover 112 may be a portion of a hook-and-loop fastener. For example, the cover 112 may be the loop portion of the hook-and-loop fastener, and a second portion 114 may be the hook portion of the hook-and-loop fastener, allowing the cover 112 to be secured over the viewing port 108.

The reservoir 102 may further include an access port 116 to facilitate addition of water and nutrients (e.g., fertilizer) into the reservoir 102 during use. For example, the access port 116 may be formed of a stop-cock or other re-sealable port.

Figure 2:
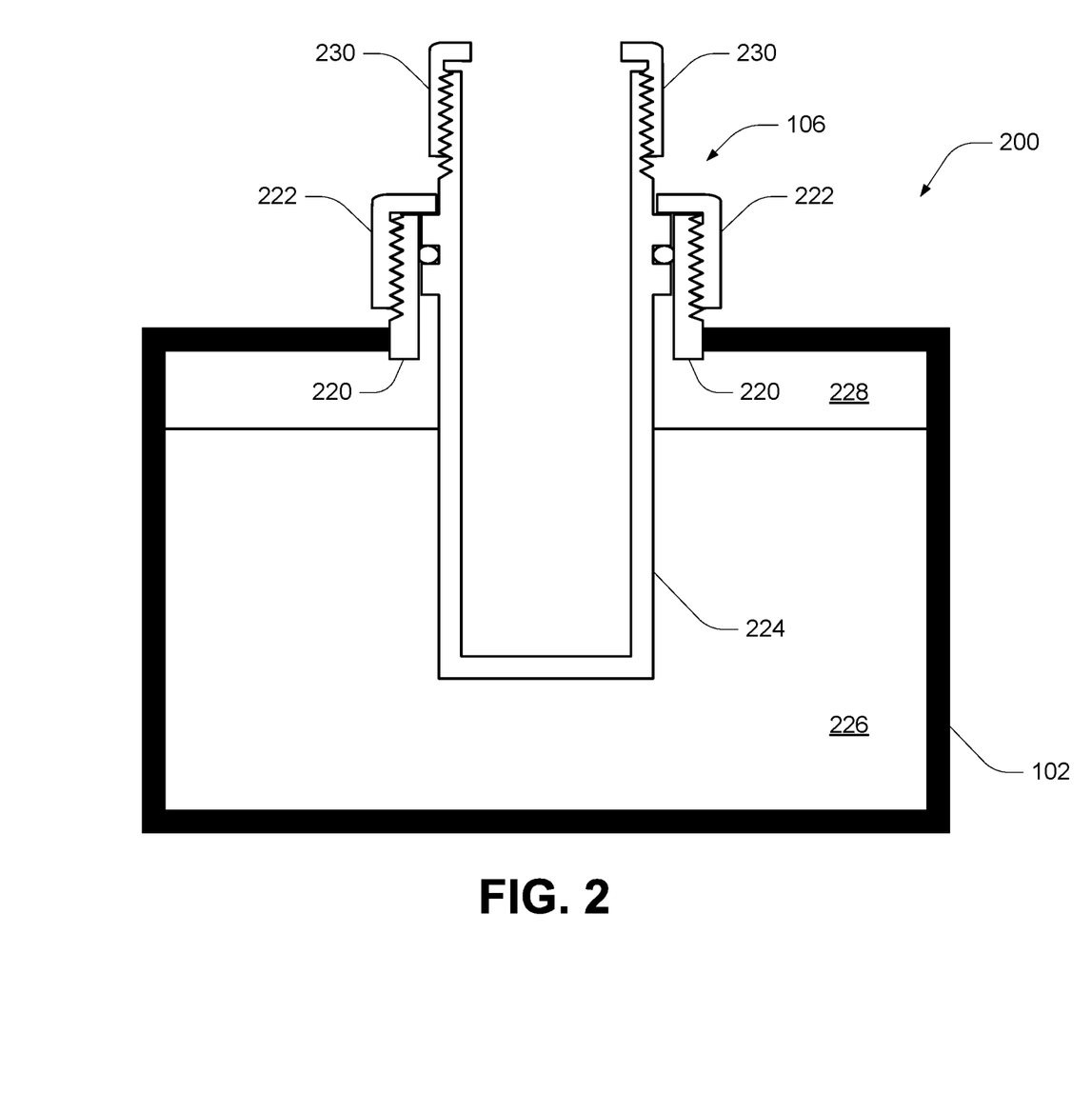
FIG. 2 depicts a cross-sectional view of a passive nutrient delivery system according to another embodiment.

FIG. 2 depicts a cross-sectional view of a passive nutrient delivery system 200 according to another embodiment. For clarity, some components of the passive delivery system 200 are either omitted from FIG. 2 or not identified by reference number. However, such components are described in detail in additional figures.

The system 200 includes a reservoir 102 and a rooting module 106. The reservoir 102 may contain water 226 surrounding the rooting module 106, and may further contain a void 228. Levels of the water 226 and void 228 may fluctuate during plant growth.

The reservoir 102 may include a receiving port 220 for removably receiving the rooting module 106. To aid in maintaining a watertight environment, the receiving port 220 may be mated to the rooting module 106. For example, if the rooting module 106 is cylindrical in nature, the opening of the receiving port 220 may likewise be cylindrical in nature. The rooting module 106 may be removably attached to the reservoir 102. As an example, the receiving port 220 may be threaded on its exterior, and a first retainer 222 may be threaded on its interior to allow it to be screwed onto the receiving port 220. The retainer 222 may be permanently attached to the body portion 224 of the rooting module 106.

The rooting module 106 may further include a second retainer 230. The second retainer 230 may facilitate retention of components within the rooting module 106 while permitting plant growth to extend above the top of the rooting module 106. For example, the body portion 224 may be threaded on its exterior, and the second retainer 230 may be threaded on its interior to allow it to be screwed onto the body portion 224. Although continuous threaded connections between the first retainer 222 and the receiving port 220, and between the second retainer 230 and the body portion 224, are depicted in FIG. 2, other forms of connection may be utilized. As an example, these connections may alternatively utilize closure systems such as found in lug caps, with lugs on the interior of the retainer corresponding with non-continuous threads facilitating a quarter turn closure, such as found on many glass beverage bottles, or closure systems such as found in many reusable food containers incorporating a flexible snap closure.

The receiving port 220, the first retainer 222, the body portion 224, and the second retainer 230 may all be formed of a watertight material (e.g., a plastic, such as polyvinyl chloride (PVC)). As one example, the rooting modules 106 may be formed using commercial off-the-shelf slip fix PVC repair fittings, PVC DWV (drain, waste, vent) trap adapter fittings, and PVC slip cap fittings. Alternatively, the rooting modules 106 may be custom manufactured to incorporate features of the various embodiments as described.

Figure 3A:
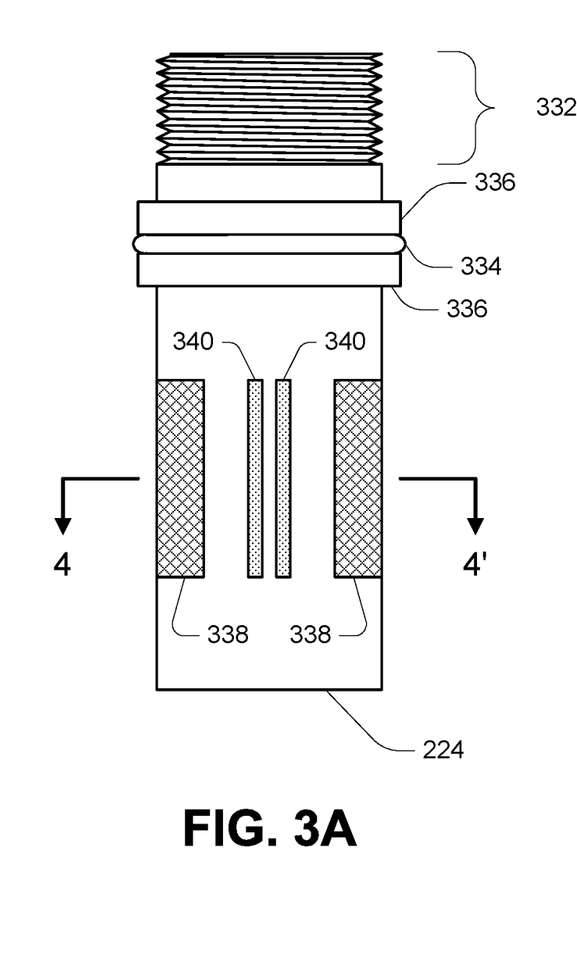
FIG. 3A depicts a side view of a body portion of a rooting module for the passive nutrient delivery system of FIG. 2 according to an embodiment.

FIG. 3A depicts a side view of a body portion 224 of a rooting module 106 for the passive nutrient delivery system 200 of FIG. 2 according to an embodiment. The body portion 224 may include a threaded portion 332 as discussed supra. The body portion 224 may include a sealing surface (e.g., an O-ring 334), to facilitate a watertight seal between the receiving port 220 (FIG. 2) and the body portion 224. To retain the O-ring 334, the body portion 224 may further include ridges 336.

The body portion 224 may include one or more oxygen permeable areas 338 in a sidewall of the body portion 224. The oxygen permeable areas 338 may utilize the same or different construction as the oxygen permeable areas 104 of FIGS. 1A and 1B. The collective area of the oxygen permeable areas 338 may be determined, for example, from an expected oxygen need of a plant to be grown in the rooting module relative to an ability of the oxygen permeable membrane to pass oxygen to the interior of the body portion 224 in the installed ambient conditions. The body portion 224 may further include two or more openings 340 in a sidewall of the body portion 224 for insertion of wicking material (not shown in FIG. 3A). The dimensions of each opening 340 may be determined from a width and thickness of the wicking material to be inserted. For example, an opening 340 may have dimensions substantially equal to (e.g., equal to) the width and thickness of the wicking material to facilitate sealing the opening 340 once the wicking material is inserted, and may further have dimensions less than the width and thickness of the wicking material while still allowing its insertion where the wicking material is compressible. Alternatively, where the dimensions of the openings 340 are larger than the relevant dimensions of the wicking material, a gasket may be used as will be discussed with reference to FIG. 3G.

Figure 3B:
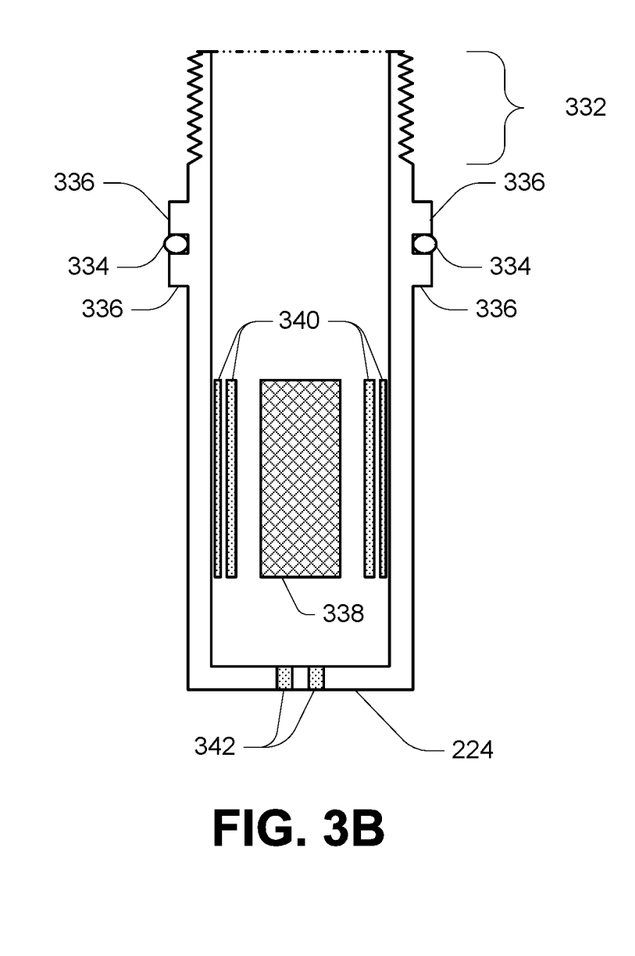
FIG. 3B depicts a vertical cross-sectional view of the body portion of the rooting module of FIG. 3A according to an embodiment.

FIG. 3B depicts a vertical cross-sectional view of the body portion 224 of the rooting module of FIG. 3A according to an embodiment. FIG. 3B depicts that the body portion 224 may further include openings 342 for insertion of additional wicking material (not shown in FIG. 3B). The dimensions of each opening 342 may be determined from a width and thickness of the wicking material to be inserted. For example, an opening 342 may have dimensions substantially equal to (e.g., equal to) the width and thickness of the wicking material to facilitate sealing the opening 342 once the wicking material is inserted, and may further have dimensions less than the width and thickness of the wicking material while still allowing its insertion where the wicking material is compressible. Alternatively, where the dimensions of the openings 342 are larger than the relevant dimensions of the wicking material, a gasket may be used as will be discussed with reference to FIG. 3G.

Figure 3C:
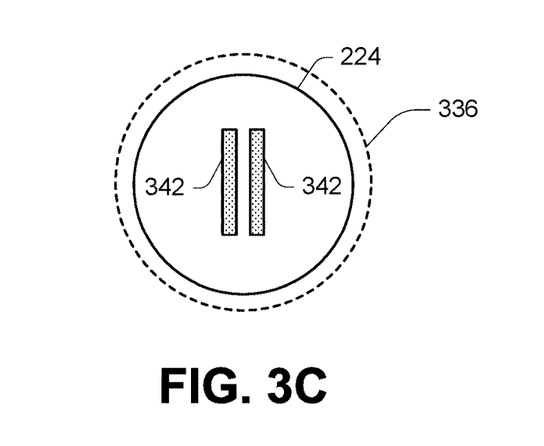
FIG. 3C depicts a bottom view of the body portion of the rooting module of FIG. 3A according to an embodiment.

FIG. 3C depicts a bottom view of the body portion 224 of the rooting module of FIG. 3A according to an embodiment. FIG. 3C depicts the openings 342 in additional detail.

Figure 3D:
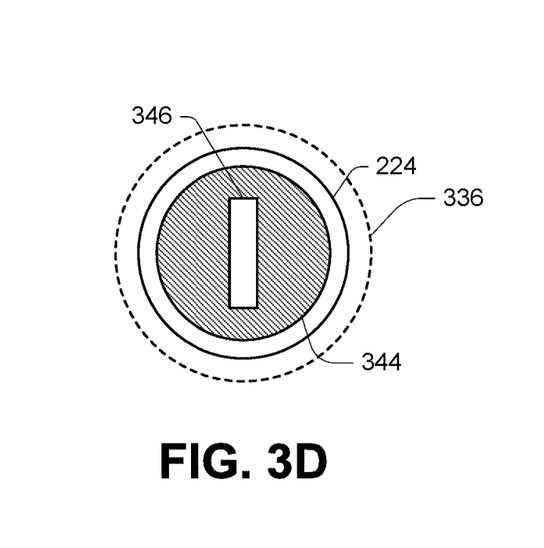
FIG. 3D depicts a top view of the body portion of the rooting module of FIG. 3A according to an embodiment.

FIG. 3D depicts a top view of the body portion 224 of the rooting module of FIG. 3A according to an embodiment. FIG. 3D depicts a plug 344 inserted into the body portion 224. The plug 344 may aid containment of a substrate (not shown in FIG. 3D) suitable for plant growth within the body portion 224. The plug 344 may be a foam (e.g., open-cell foam) plug that may further be hydrophilic. The plug 344 may include an opening 346. The opening 346 may be sized to permit two thicknesses of the wicking material to extend through the plug 344 while further permitting insertion of seeds between layers of the wicking material. As one example, the plug 344 may include a foam medium (e.g., HORTICUBES available from OASIS Grower Solutions, Kent, Ohio, USA) which is generally hydrophilic and approximately 98% void.

Figure 3E:
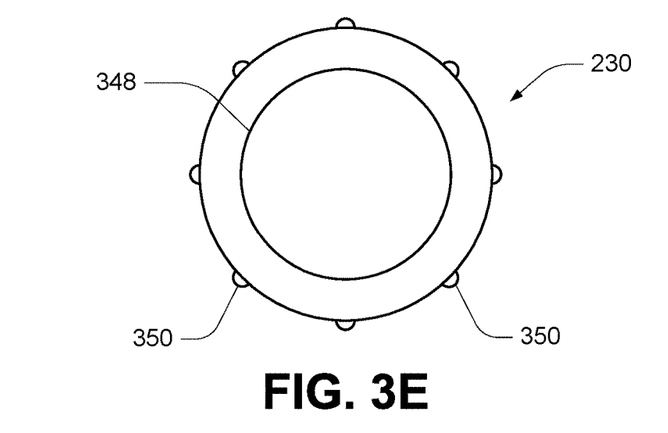
FIG. 3E depicts a top view of a retainer for the body portion of the rooting module of FIG. 3A according to an embodiment.

FIG. 3E depicts a top view of the second retainer 230 for the body portion 224 of the rooting module of FIG. 3A according to an embodiment. The second retainer 230 may include an opening 348 to facilitate access to the opening 346 of the plug 344. The second retainer 230 may further include ridges 350 to aid in gripping the second retainer 230 for attachment to the body portion 224.

Figure 3F:
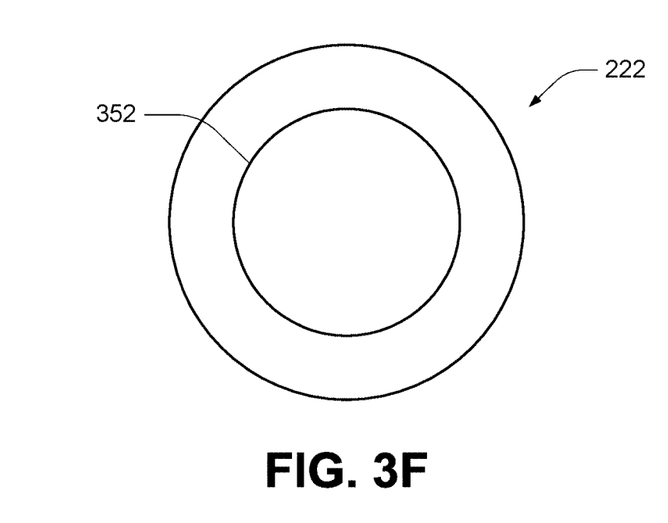
FIG. 3F depicts a top view of another retainer for the body portion of the rooting module of FIG. 3A according to an embodiment.

FIG. 3F depicts a top view of the first retainer 222 for the body portion 224 of the rooting module of FIG. 3A according to an embodiment. The first retainer 222 may include an opening 352 to facilitate extension of the body portion 224 through the first retainer 222. The first retainer 222 may further include ridges such as described with reference to FIG. 3E.

Figure 3G:
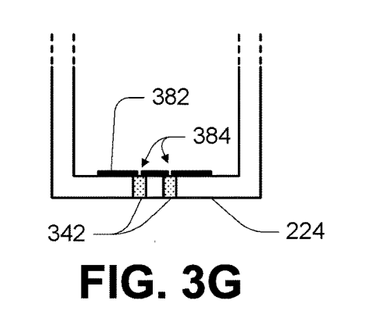
FIG. 3G depicts a vertical cross-sectional view of a portion of the body portion 224 of the rooting module of FIG. 3A according to an embodiment.

For example, FIG. 3G depicts a vertical cross-sectional view of a portion of the body portion 224 of the rooting module of FIG. 3A according to an embodiment incorporating a gasket 382. The gasket 382 may be attached (e.g., adhered) to the interior of the body portion 224 over the openings 342. The gasket 382 may include slits 384. The slits 384 may have dimensions substantially equal to (e.g., equal to) the width and thickness of the wicking material to facilitate sealing the opening 342 once the wicking material is inserted, and may further have dimensions less than the width and thickness of the wicking material while still allowing its insertion where the wicking material or the gasket 382 is compressible. For one embodiment, the gasket 382 may be formed of the wicking material. Although FIG. 3G only depicts the use of a gasket 382 covering openings 342, the same arrangement may be used for openings 340.

Figure 4A:
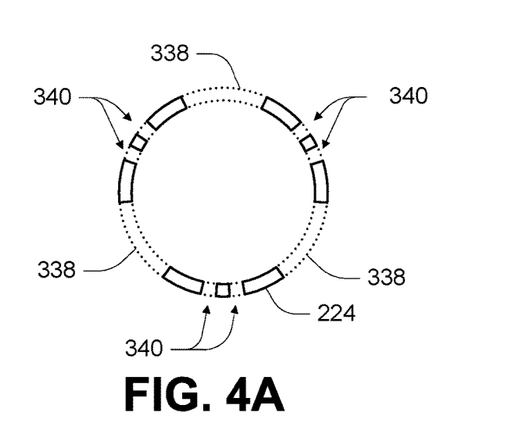
FIG. 4A depicts a horizontal cross-sectional view of the body portion of the rooting module of FIG. 3A according to an embodiment.

FIG. 4A depicts a horizontal cross-sectional view of the body portion 224 of the rooting module taken along line 4-4' of FIG. 3A according to an embodiment, showing one configuration for the openings 338 and 340.

Figure 4B:
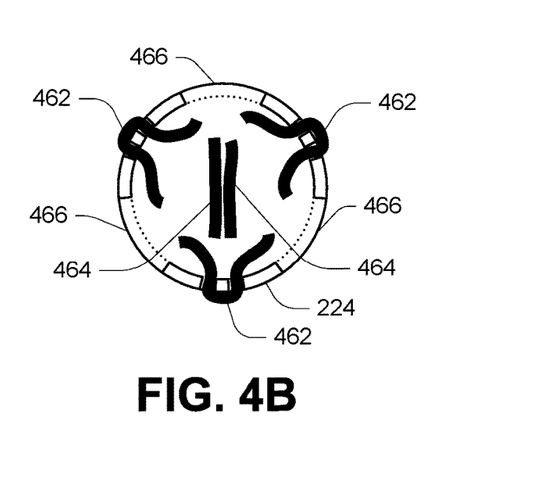
FIG. 4B depicts a horizontal cross-sectional view of the body portion of the rooting module of FIG. 3A with installed wicking material and oxygen permeable membrane according to an embodiment.

FIG. 4B depicts a horizontal cross-sectional view of the body portion 224 of the rooting module taken along line 4-4' of FIG. 3A with installed wicking material 462 and 464 extending into the interior of the body portion 224, and installed oxygen permeable membrane 466 according to an embodiment. As depicted in FIG. 4B, the wicking material 462 may have a portion exposed to the interior of the reservoir 102 when inserted therein (e.g., the portion of the wicking material 462 on the exterior of the body portion 224).

The wicking material 462 and 464 may include a capillary matting material. For example, the wicking material 462 and 464 may include CAPMAT II capillary matting available from Phytotronics, Inc., Earth City, Mo., USA, and have a thickness of approximately 1 mm. The collective area of the wicking material 462 and 464 may be determined, for example, from an expected water need of a plant to be grown in the rooting module 106 relative to an ability of the wicking material 462 and 464 to pass water to the interior of the body portion 224 in the installed ambient conditions. The oxygen permeable membrane 466 may include TYVEK COMMERCIALWRAP available from E. I. du Pont de Nemours and Company, Wilmington, Del., USA.

In the example of FIG. 4B, the wicking material 462 inserted into the sides of the body portion 224 may be 8 cm long by 2 cm wide, while the wicking material 464 inserted into the bottom of the body portion 224 may be 46 cm long by 2.5 cm wide. For one embodiment, the collective area (e.g., length×width) of the wicking material 462 may be approximately 0.2 $cm^2$ for every 1 $cm^3$ of volume of the body portion 224. For one embodiment, the collective area (e.g., length×width) of the wicking material 464 may be approximately 1.5 $cm^2$ for every 1 $cm^3$ of volume of the body portion 224.

Figure 4C:
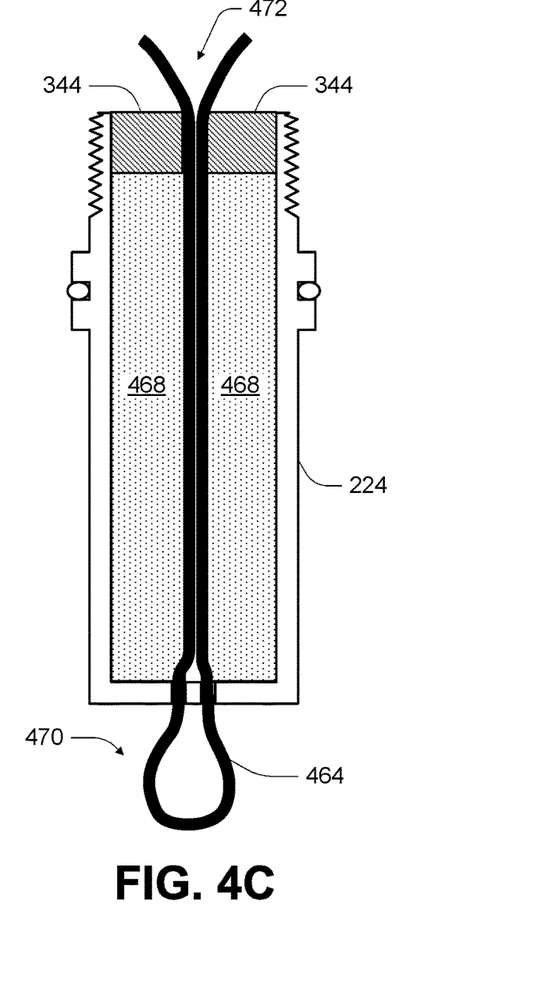
FIG. 4C depicts a vertical cross-sectional view of the body portion of the rooting module of FIG. 3A with installed wicking material, foam plug and substrate according to an embodiment.

FIG. 4C depicts a vertical cross-sectional view of the body portion 224 of the rooting module of FIG. 3A with installed wicking material 464, plug 344, and substrate 468 according to an embodiment. The substrate 468 may include an Arcellite granular substrate or other granular material suitable for supporting root growth. The substrate 468 may include inert materials (e.g., materials that may provide no substantial nutrient to the plant, but may provide a suitable physical environment for root growth and transport of water and nutrients to the plant). The substrate 468 may further include nutrients, such as a slow-release fertilizer.

As can be seen in FIG. 4C, the wicking material 464 may form a loop 470 beyond the bottom of the body portion 224, and may extend outward from the top of the body portion 224 defining an area for seed insertion 472 therebetween. As depicted in FIG. 4C, the wicking material 464 may have a portion (e.g., loop 470) exposed to the interior of the reservoir 102 when inserted therein. Where the plug 344 comprises a hydrophilic material, it may facilitate removal of excess water in the vicinity of the area for seed insertion 472. This may aid germination of any seeds as excess water surrounding the seed may hinder or inhibit germination. This may be especially important in microgravity environments, where a water film may form around a seed, which may limit oxygen availability to the seed, and may increase a risk of microbial contamination.

Figure 5:
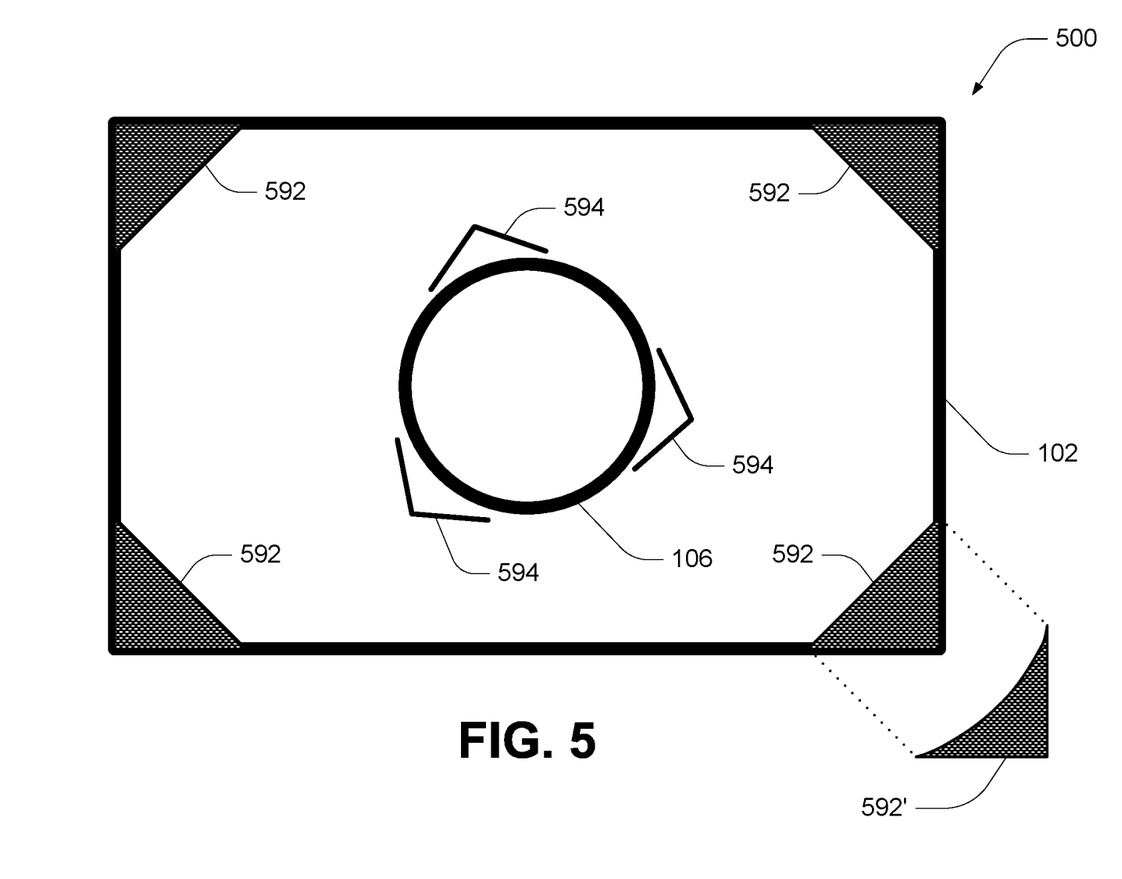
FIG. 5 depicts a top view of a passive nutrient delivery system with installed corner smoothers and vertical water directors according to an embodiment.

FIG. 5 depicts a top view of a passive nutrient delivery system 500 with installed corner smoothers 592 and vertical water directors 594 and according to an embodiment. The corner smoothers 592 may be formed in corners of the reservoir 102 (e.g., extending from the bottom of the reservoir 102). Such corner smoothers 592 may facilitate a reduction in upward creep of water within the reservoir 102 in microgravity environments by increasing the angle of corners (e.g., presenting obtuse angles to the interior of the reservoir 102).

Although FIG. 5 depicts the corner smoothers 592 to be triangular in shape, the portion of a corner smoother 592 facing the interior of the reservoir 102 need not be flat. For example, the portion of a corner smoother 592 facing the interior of the reservoir 102 may be generally concave relative to the interior of the reservoir 102, such as depicted in corner smoother 592'. Such a configuration may further facilitate a reduction in upward creep of water.

In addition, use of hydrophobic coatings on interior surfaces of the reservoir 102 may further inhibit undesirable water movement along such surfaces. Some example hydrophobic coatings may include MULTI-SURFACE HYDROPHOBIC TREATMENT available from Aculon, San Diego, Calif., USA; NANOSLIC NS 110 coating available from Florida CirTech, Greeley, Colo., USA; HYDROBEAD-T available from Hydrobead, San Diego, Calif., USA; and NANOMYTE SUPERCN available from NEI Corp., Somerset, N.J., USA.

The vertical water directors 594 may be angular features extending adjacent the rooting module 106. A vertical water director 594 may be placed to face each set of openings 340 of the rooting module 106. Such vertical water directors 594 may facilitate an increase in upward creep of water within the reservoir 102 where water may be desired (e.g., to the portions of wicking material 462 exposed to the interior of the reservoir 102).

In addition, the use of hydrophilic coatings on surfaces may facilitate an increase in upward creep of water where desired. For example, surfaces of the vertical water directors 594 facing the rooting module 106 may be treated in this manner. Similarly, surfaces of the body portion of the rooting module 106 desired to be in contact with water in the reservoir 102 may be similarly treated. Some example hydrophilic coatings may include LUBRICENT UV available from Harland Medical Systems, Eden Prairie, Minn., USA; and SCS PARYLENE coatings available from Specialty Coating Systems, Indianapolis, Ind., USA.

The description of the present invention has been presented for purposes of illustration and description, but is not intended to be exhaustive or limited to the disclosure in the form disclosed. Many modifications and variations will be apparent to those of ordinary skill in the art without departing from the scope of the invention. The described embodiments were chosen and described in order to best explain the principles of the invention and the practical application, and to enable others of ordinary skill in the art to understand the invention for various embodiments with various modifications as are suited to the particular use contemplated.

What is claimed is:

1. A passive nutrient delivery system, comprising:
   a rooting module comprising:
      a body portion having a top, a bottom, and a sidewall extending between the top and the bottom;
      a hydrophilic plug in a first portion of an interior of the body portion adjacent to the top of the body portion, the plug having an opening;
      a substrate in a second portion of the interior of the body portion between the bottom and the plug;
      a first wicking material extending through the sidewall of the body portion into the second portion of the interior of the body portion; and
      a second wicking material extending through the body of the body portion into the interior of the body portion, through the interior of the body portion, and through the opening of the plug.

2. The system of claim 1, wherein the rooting module further comprises a first set of openings in the sidewall of the body portion and a second set of openings in the bottom of the body portion, wherein the first wicking material extends through the first set of openings, and wherein the second wicking material extends through the second set of openings.

3. The system of claim 2, further comprising a first gasket attached to the interior of the body portion over the first set of openings, and a second gasket attached to the interior of the body portion over the second set of openings, wherein the first wicking material extends through the first gasket, and wherein the second wicking material extends through the second gasket.

4. The system of claim 1, wherein the rooting module further comprises a third wicking material extending through the sidewall of the body portion into the interior of the body portion.

5. The system of claim 1, wherein the hydrophilic plug comprises a foam.

6. The system of claim 1, wherein the substrate comprises a granular material.

7. The system of claim 6, wherein the substrate further comprises plant nutrients.

8. The system of claim 7, wherein the plant nutrients comprise a slow-release fertilizer.

9. The system of claim 1, further comprising a reservoir, wherein the reservoir comprises a receiving port for removably receiving the rooting module.

10. A passive nutrient delivery system, comprising:
    a reservoir comprising a receiving port; and
    a rooting module configured to be removably inserted into the receiving port, wherein the rooting module comprises:
       a body portion having a top, a bottom, and a sidewall extending between the top and the bottom;
       a hydrophilic plug in a first portion of an interior of the body portion adjacent the top of the body portion, the plug having an opening;
       a substrate in a second portion of the interior of the body portion between the bottom and the plug;
       a first wicking material extending through the sidewall of the body portion into the second portion of the interior of the body portion; and
       a second wicking material extending through the body of the body portion into the interior of the body portion, through the interior of the body portion, and through the opening of the plug.

11. The system of claim 10, wherein the reservoir further comprises a corner smoother in a corner of the reservoir extending vertically from a bottom of the reservoir.

12. The system of claim 10, wherein the reservoir further comprises a vertical water director adjacent the first wicking material of the rooting module.

13. The system of claim 12, wherein a surface of the vertical water director facing the first wicking material comprises a hydrophilic coating.

14. The system of claim 10, wherein an interior surface of the reservoir comprises a hydrophobic coating.

15. The system of claim 10, wherein the rooting module is a first rooting module, and wherein the system further comprises a second rooting module, the second rooting module comprising:
- a body portion having a top, a bottom, and a sidewall extending between the top and the bottom;
- a hydrophilic plug in a first portion of an interior of the body portion adjacent the top of the body portion, the plug having an opening;
- a substrate in a second portion of the interior of the body portion between the bottom and the plug;
- a first wicking material extending through the sidewall of the body portion into the second portion of the interior of the body portion; and
- a second wicking material extending through the body of the body portion into the interior of the body portion, through the interior of the body portion, and through the opening of the plug.

16. A passive nutrient delivery system, comprising:
a reservoir comprising a plurality of receiving ports and an access port; and
a plurality of rooting modules each configured to be removably inserted into, and removably attached to, any receiving port of the plurality of receiving ports, wherein each rooting module of the plurality of rooting modules comprises:
- a body portion having a top, a bottom, and a sidewall extending between the top and the bottom;
- a hydrophilic plug in a first portion of an interior of the body portion adjacent the top of the body portion, the plug having an opening;
- a substrate in a second portion of the interior of the body portion between the bottom and the plug;
- a plurality of first wicking materials, each first wicking material of the plurality of first wicking materials extending through the sidewall of the body portion into the second portion of the interior of the body portion; and
- a second wicking material extending through the body of the body portion into the interior of the body portion, through the interior of the body portion, and through the opening of the plug.

* * * * *